Dec. 14, 1965 J. J. RILEY 3,223,901

RECTIFIER ASSEMBLY HAVING BALANCED IMPEDANCE PATHS FOR PARALLEL CONNECTED DIODES

Filed June 8, 1962 4 Sheets-Sheet 1

INVENTOR.
JOSEPH J. RILEY
BY
Francis J. Klempay
ATTORNEY

Dec. 14, 1965 J. J. RILEY 3,223,901

RECTIFIER ASSEMBLY HAVING BALANCED IMPEDANCE PATHS
FOR PARALLEL CONNECTED DIODES

Filed June 8, 1962 4 Sheets-Sheet 2

INVENTOR.
JOSEPH J. RILEY

BY Francis J. Klempay
ATTORNEY

INVENTOR.
JOSEPH J. RILEY
BY Francis J. Klempay
ATTORNEY

INVENTOR.
JOSEPH J. RILEY
BY Francis J. Klempay
ATTORNEY

United States Patent Office 3,223,901
Patented Dec. 14, 1965

3,223,901

RECTIFIER ASSEMBLY HAVING BALANCED IMPEDANCE PATHS FOR PARALLEL CONNECTED DIODES

Joseph J. Riley, Warren, Ohio, assignor to The Taylor-Winfield Corporation, Warren, Ohio, a corporation of Ohio Filed June 8, 1962, Ser. No. 201,157
5 Claims. (Cl. 317—234)

This invention relates to improved apparatus for furnishing low voltage direct current at high amperages to such loads as resistance welding apparatus, for example, and more particularly to such apparatus powered by a multiple phase alternating current energy source and constructed within such practical dimensional limitations as to be suitable for use in unitary self-contained welding equipment wherein the output of the rectifier assembly may be closely coupled with the load for increased efficiency and for minimum cost of manufacture. Recent progress in the semiconductor art has lead to the practical development of dry rectifiers of the semiconductor type utilizing silicon to provide units capable of translating fairly high currents with reasonable reliability and without appreciable heating. However, such silicon diodes have the inherent characteristics of being rather sensitive (as regards their current conductivity) to variations in the applied voltage particularly in the lower ranges normally required for resistance welding processes. High currents are required for resistance welding which means that a large number of the silicon diodes must be arranged in parallel to carry the heavy load, and this latter requirement encounters the known problem of promoting fairly equal current division between the parallel cells.

Heretofore, attempts to use large numbers of semiconductor diodes connected in parallel to supply heavy currents to very low resistance loads such as resistance welding, for example, have generally resulted in unstable and unreliable systems due to nonuniformity in the currents carried by the respective cells and the consequent frequency of complete breakdown in certain of the cells. In such applications, practical machine design considerations require a low terminal voltage to the input of the rectifiers and while the load voltage drop may be quite low it is nevertheless usually greater than the normal voltage drop across the semiconductor diode. Thus, the system is inherently lacking in any current regulating characteristic as regards the respective parallel connected diodes, and to overcome this instability it has heretofore been proposed to place a separate resistance or impedance in series with each of the diodes, the series resistance or impedance having an operating voltage drop of three to four times the voltage drop across the diode. The use of these series resistances or impedances is highly objectionable, however, for space and design considerations and because of the problem of dissipating the large amount of extra heat generated. It is also obvious that this system is very inefficient from a power requirement standpoint.

The primary object of the present invention is to provide an improved and simplified mechanical arrangement for mounting a large number of semiconductor diodes in parallel to supply very heavy currents at low voltages to such loads as resistance welding loads, for example, under conditions wherein the respective diodes or cells will each maintain a substantially uniform voltage drop across it so as to thereby permit the cells to be safely operated at near maximum capacity. Further objects of the invention include the accomplishment of the stated primary object in apparatus of practical size suitable for being physically embodied in a self-contained resistance welding machine, an arrangement whereby the individual diodes are readily available for testing and replacement, and a geometric configuration of the mechanical parts required whereby the principles of the invention may be readily utilized for multiple phase power translation with provisions made for low-loss direct coupling between the terminals of the transformer secondaries and the load.

The above objects of my invention are accomplished, primarily, by so arranging the parallel connected diodes in such geometric pattern and on such mounting means that the impedance of the current paths from the A.C. source to the respective diodes remain substantially the same as does also the impedance of the current paths between the diodes and the D.C. output path. For multiple phase operation, I provide a novel arrangement for carrying the currents from the different phases of the transformer to the paths first mentioned above. Further, in these multiple phase systems I position the heavy-current-carrying neutral connection in geometric symmetry to each of the cells of a parallel connected group so as to render the effect of the magnetic field thrown up by the neutral current uniform on all of the cells of each parallel connected group.

The above and other objects and advantages of the invention will become apparent upon consideration of the following specifications and the accompanying drawing wherein there is disclosed preferred embodiments of the invention.

Figure 1:
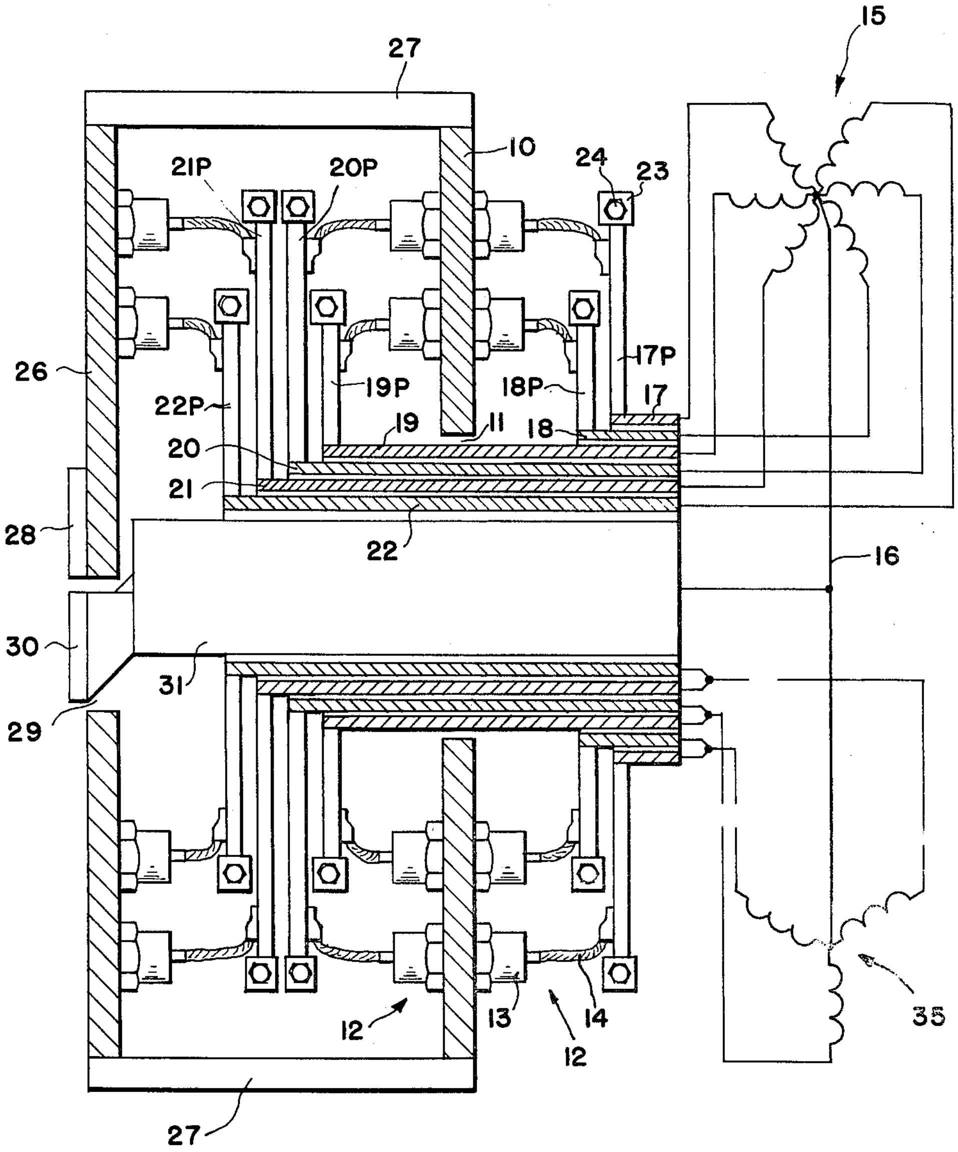
FIGURE 1 is a vertical section of a full-wave three-phase rectifier assembly utilizing semiconductor diodes and constructed in accordance with the principles of my invention, the connections to the transformer secondaries being shown schematically.

Referring now first to FIGURE 1, reference numeral 10 designates a heavy rectangular copper plate which is suitably supported by means, not shown, and which has a large centrally disposed aperture 11 therethrough. The diodes are shown at 12, and each has a base 13, and a flexible current-conducting lead 14. As is well known in the art, commercially available models of these silicon diodes have their bases provided either with a threaded shank for mounting in a threaded bore or a threaded recess whereby they may be readily mounted on a plate by means of a bolt passing through an aperture in the plate. Diodes 12 are rigidly mounted on either side of the plate 10 by either of the above recited methods and are arranged in a geometric pattern for a particular purpose to be described below.

Figures 2, 5:
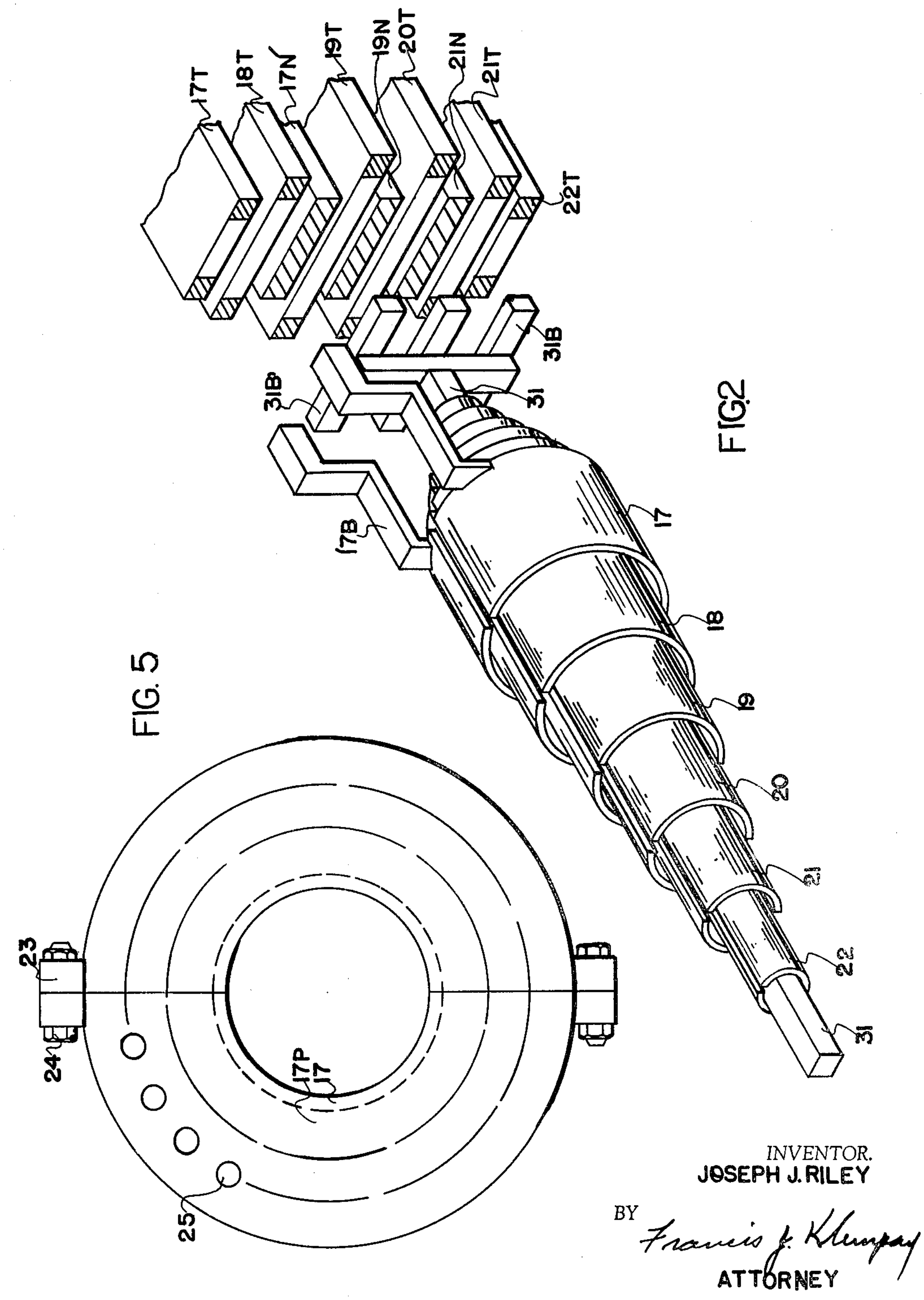
FIGURE 2 is a perspective view of a portion of the assembly of FIGURE 1 showing the manner in which certain of the conductors of the assembly of FIGURE 1 may be connected to the secondary terminals of the transformer.
FIGURE 5 is a front elevation of an A.C.-connected plate used in the assembly of FIGURE 1.
Figure 3:
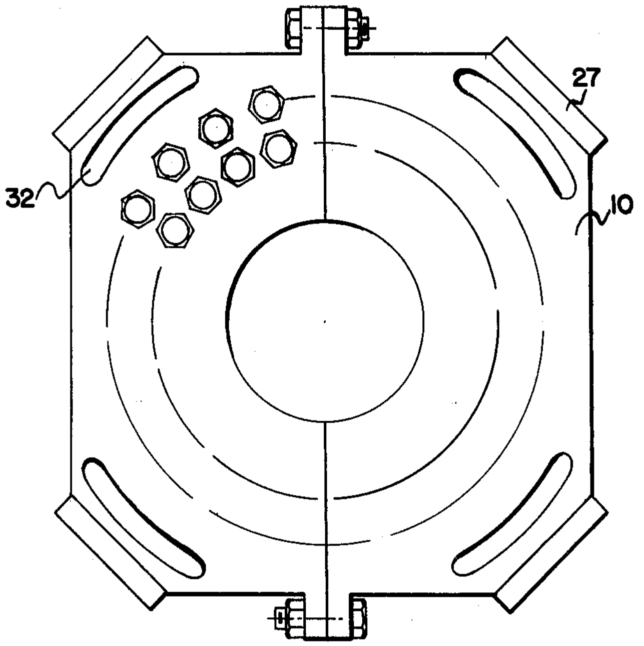
FIGURE 3 is a front elevation of a D.C.-connected plate utilized in the assembly of FIGURE 1.
Figure 4:
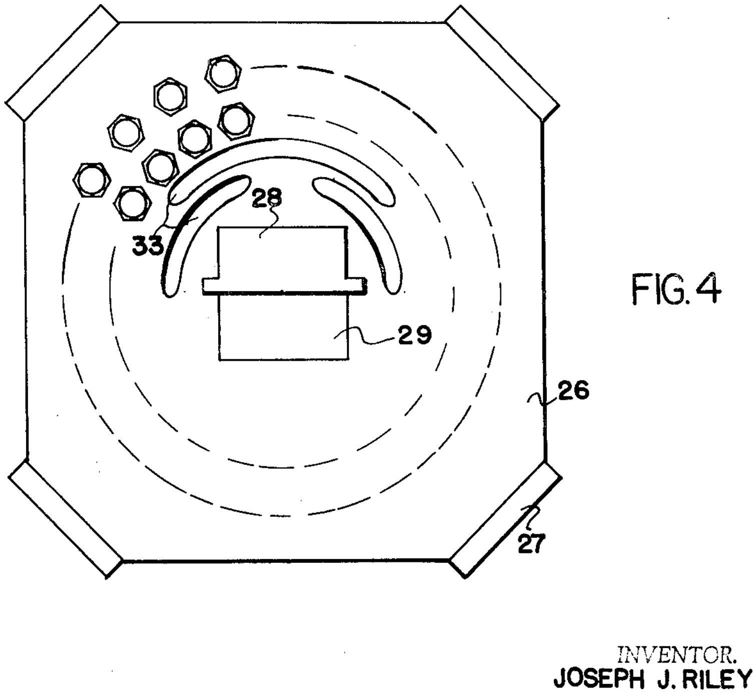
FIGURE 4 is a front elevation of a second D.C.-connected plate utilized in the assembly of FIGURE 1.

Reference numeral 15 designates the secondary assembly of a three-phase delta-star connected transformer and as such has six windings connected at one end to a common neutral conductor 16 and six outer terminals which are respectively connected to concentric insulated tubes 17 thru 22. The latter are made of highly conductive material such as drawn copper and, as shown in FIGURE 2, are preferably made in longitudinal half sections for a purpose to be later described. Brazed to the forward end of the half sections of the tube 17 are the plate segments 17P, and similar plate segments 18P thru 22P are brazed to the forward ends of each of the other tube sections 18 through 22. Each of these various plate segments have apertured ears 23 to receive bolts 24 whereby the half sections with plate segments brazed thereon may be secured together at assembly. It should be noted that the plate formed by the segments 17P is of larger effective diameter than the plate formed by the segments 18P. The purpose of this is to provide spacing and clearance for the leads 14 of the two groups of diodes which are mounted in concentric circles on the face of the plate 10 which is toward the segments 17P and 18P. As indicated in FIGURE 5 (at 25) the terminals of the leads 14 of the diodes 12 which are mounted in the outer ring on the adjacent face of plate 10 are secured, preferably by bolting, to the plate made up of the segments 17P in evenly spaced relation and in a circle concentric about the tube 17. It should be noted that the impedance path from the tube 17 to each of the connections 25 is equal.

To compensate for the larger diameter of the plate 17P with respect to the plate 18P to thereby provide paths of equal impedance to the two groups of diode anodes connected to these plates the plate 18 may be suitably apertured or cored-out to suitably increase the lengths of the paths from the tube 18 to the anode connections made thereon. Alternatively, the compensation may be made by selecting an alloy of somewhat less conductivity for the plate 18P.

At the forward end of the rectifier assembly is a second heavy copper plate 26 which is electrically connected to the plate 10 by the current-conductive bars 27. Plate 26 has a pad 28 conductively attached to it at a location slightly above its center. Below this pad is an opening 29 through which extends a second pad 30 forming the other terminal of the output of the rectifier assembly. Pad 30 is preferably integral with a heavy conductive bar 31 which extends axially through the nested tubes 17–22 and which leads back to the neutral terminals of the multiple phase transformer. This is shown schematically at 16 in FIGURE 1.

As illustrated in FIGURE 1, an inner ring of diodes 12 are mounted on the inner face of plate 10 with their opposite or anode terminals being connected to a peripheral portion of the plate 19P which is brazed onto the forward end of the tube 19. This arrangement is a duplicate of the diode interconnection between plates 10 and 18P and, likewise, the diode interconnection between plates 20P and 10 is the same as the interconnection between the plates 10 and 17P. The innermost tubes 21 and 22 are similarly coupled with the plate 26, and inasmuch as the plates 10 and 26 are interconnected by the conductive bars 27 it will be obvious that all of the direct current produced will be available at the terminal pads 28 and 30. In a representative use of the assembly these pads 28 and 30 may be closely coupled with resistance welding electrodes as will be readily understood.

As originally stated above, one of the objects of the invention is to equalize the impedance in the total circuit for each diode in any parallel connected group. It should be obvious from the above that the anode-connected total circuit components are so equalized by the concentric nature of the plates 17P–22P about the tubular conductors 17–22. Generally similar arrangements may, of course, be employed for the base connected circuit components—utilizing a conductive tube for interconnecting the plates 10 and 26 and centrally disposing the pad 28 but this involves problems of accessibility, manufacturing and costs, and it is therefore preferred to use the interconnecting bars 27 and position the pad 28 as illustrated. To compensate for the closer proximity of certain of the diode bases on plate 10 to the bars 27 the plate 10 may be cored-out or apertured at predetermined locations as shown at 32 so that the paths between each parallel connected diode and the bars 27 will be substantially uniform. Similarly, to compensate for the off-center position of the output terminal pad 28 suitably disposed elongated apertures 33 are made in the plate 26. These apertures 33 not only compensate for the unequal distances between the parallel connected diode bases which are mounted on the plate 26 and the pad 28 but also for the unequal distances between the various bars 27 and the pad 28. The result of the composite geometric and mechanical arrangement of the assembly is that the voltage drop across each of the diodes of any parallel connected group is substantially the same so that the total amperage translated by each group is evenly divided between the cells thereby enabling the cells to be operated efficiently near their maximum capacity without danger of internal shorting or other breakdown. Further, the respective groups of parallel connected cells also translate an equal division of the total current supply.

Referring now more particularly to FIGURE 2, the manner in which the sleeves or tubes 17–22 and the neutral bus 31 may be connected to the output terminals of a delta-star connected welding transformer will now be described. The center taps of the three principal secondary windings of the transformer are connected to the exposed terminals 17N, 19N and 21N. To the rear end of the neutral bus 31 is rigidly fastened three bars 31B which, upon assembly, are adapted to overlie the faces of the terminals 17N, 19N and 21N, and suitable means such as cap screws or bolts, not shown, is employed to rigidly connect the bars onto the terminals.

One terminal end of the phase winding which has its center tap connected to 17N is brought to a terminal 17T while the opposite end is connected to a terminal 18T. Similarly, the ends of the other phase secondaries are connected to terminals 19T thru 22T. It will be understood that the terminals 17T thru 22T will be connected respectively to the tubular conductors 17 thru 22. To accomplish this, a conductive bracket such as shown at 17B is brazed onto the rear exposed portion of each of the two sections of each of the tubular conductors 17 thru 22, and these various brackets are so shaped and spaced that they may be brought into and held in engagement with the various terminals 17T thru 22T to provide the interconnections above stated. Again, suitable cap screws or bolts not shown, may be employed to lock the various conductive brackets onto the various terminals 17T thru 22T.

While I have illustrated and described above a full-wave three-phase delta-star connected rectifier assembly utilizing the principles of my invention, it should be understood that the principles of the invention are equally applicable to single phase half or full cycle systems and to three-phase half-wave systems utilizing a delta-Y connected transformer. Thus, in FIGURE 1 there is illustrated at 35 how the Y connected secondary of a welding transformer may be used to power the rectifier assembly instead of the star secondary 15. In this alternate powering arrangement the load of each phase is divided between two groups of parallel connected diodes, but as explained above, the division of current between the two groups will be substantially equal due to the mechanical arrangement of the apparatus.

Figure 6:
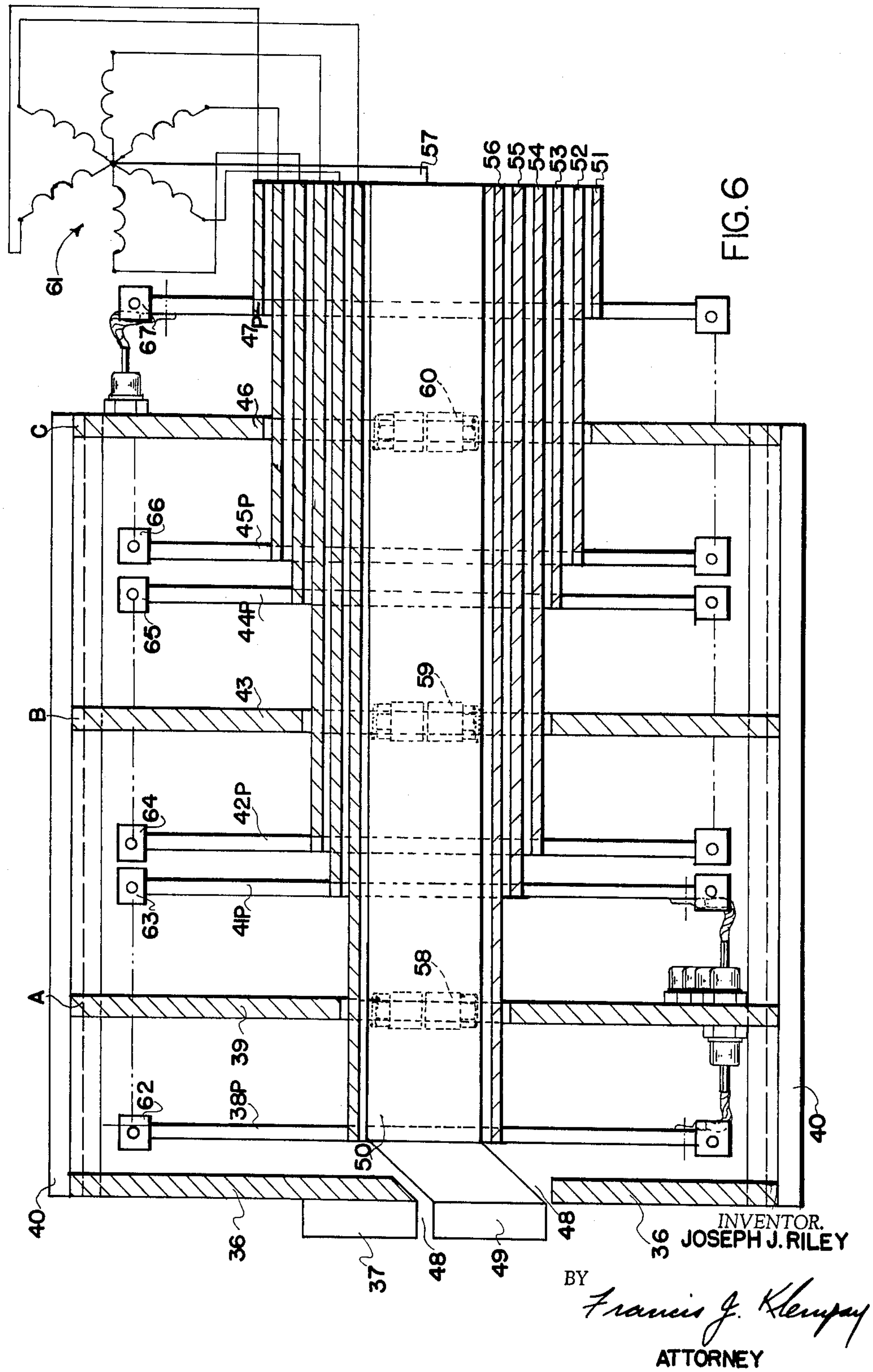
FIGURE 6 is a vertical longitudinal section of a modified form of rectifier-assembly constructed in accordance with the principles of the invention.

The principles of my invention are also applicable to various mechanical arrangements other than that shown in FIGURE 1. For example, in a star-connected system I may provide a separate D.C. plate for each of the three phases of the A.C. source with a single circle of diodes mounted on each face of each plate. Of course, an A.C. plate (similar to 18P) would be provided on either side of each D.C. plate to connect the anodes of the adjacent diodes. Since then the current translated by the diodes on one face of each plate would be 180 degrees out of phase with the current translated by the diodes of the opposite face of each plate there would be essentially no overlapping in any plate, there would be a minimum of impedance voltage drop in the plates, and all the plates could possibly be made of lighter section and of smaller diameter. However, this embodiment would necessarily increase the axial length of the assembly. Thus in FIGURE 6 is shown the mechanical arrangement of such A.C. and D.C. plates. To the first and outer D.C. plate 36 pad 37 is conductively attached at a location slightly above its center. Below this pad is an opening 48 through which extends a second pad 49 forming the other terminal of the output of the rectifier assembly. Pad 49 is preferably integral with a heavy conductive bar 50 which extends axially through the nested tubes 51–56 and which leads back to the neutral terminals of the multiple phase transformer. This is shown schematically at 57 in FIGURE 6. The nested tubes 51–56 function in the same manner as do nested tubes 17–22 in the embodiment of FIGURE 1. D.C. plate 36 is conductively attached to the other D.C. plates 39, 43, and 46 by four heavy and highly conductive bars 40 of which two are shown. In succession behind plate 36 is an A.C. plate 38P which translates current thru silicon diodes to D.C. plate 39. Also translating current thru silicon diodes to D.C. plate 39 is another A.C. plate 41P. The current translated to D.C. plate 39 from A.C. plate 41P is 180° out of phase in respect to A.C. plate 38P. The A.C. plates 38P, 41P and the A.C. plate 39 implicitly comprises phase A.

In phase B is an A.C. plate 42P which translates current thru silicon diodes to D.C. plate 43. Also translating current thru silicon diodes to D.C. plate 43 is another A.C. plate 44P. The current translated to D.C. plate 43 from A.C. plate 44P is 180° out of phase in respect to A.C. plate 42P.

In phase C is an A.C. plate 45P which translates current thru silicon diodes to D.C. plate 46. Also translating current thru silicon diodes to D.C. plate is another A.C. plate 47P. The current translated to D.C. plate 46 from A.C. plate 47P is 180° out of phase in respect to A.C. plate 45P.

Lugs 58, 59, and 60 tie together the two halves of D.C. plates 39, 43, and 46, respectively. The lugs 62, 63, 64, 65, 66, and 67 tie together the two halves of the A.C. plates 38P, 41P, 42P, 44P, 45P, and 47P, respectively. 61 as in 16 of FIGURE 1 is the secondary wind of a delta star arranged multiple phase transformer.

It should now be apparent that I have provided an improved semiconductor diode rectifier assembly which accomplishes the objects initially set out. By providing for the equal current division as between the diodes in each parallel connected group the diodes may be safely operated at near capacity loads, and by providing for equal current division between the groups the overall assembly makes efficient use of the components, and may be made compact in size to facilitate installation in a resistance welding machine, for example. Also, short and efficient coupling between the A.C. power source and the point of use of the D.C. current may be effected. The open nature of the assembly coupled with a circular mounting of the diodes renders individual diodes readily accessible for testing and replacement. Another advantage of the circular mounting is that a large number of diodes may be utilized in parallel for each half phase of the source to provide the heavy currents desired or to reduce the loads on the individual cells and, further, to reduce the disturbance on the remaining good cells if one or more in the parallel connected group should fail.

Since, as pointed out above, the principles of the invention herein disclosed are applicable in various embodiments reference should be had to the appended claims in determining the scope of the invention.

I claim:

1. A compact rectifier and output terminal assembly for supplying heavy D.C. current from a multiple phase A.C. source comprising in combination a neutral bus bar, a plurality of nested current-conductive tubes of unequal diameters positioned concentrically about said bar and insulated from each other and from said bar, said bar having an output terminal end, the ends of said tubes which are adjacent said output terminal end having a stepped relation to each other resulting from the smaller diameter tubes extending outwardly beyond the adjacent ends of the larger diameter tubes, a current-conductive disc-like plate for each of the tubes mounted on their step end extremities and arranged in generally parallel relation to each other concentric about the tubes, a current-conductive output plate having an output terminal area adjacent the output terminal end of said bar and disposed generally parallel with said first mentioned plates, and a multiplicity of semi-conductor diodes mounted on said output plate in concentric circular patterns concentric about said tubes and interconnecting each of said first mentioned plates with said output plate.

2. Apparatus according to claim 1 further characterized in that said first mentioned plates are of increasing diameter in a direction away from said output plate whereby the leads of said diodes which extend from the larger of said first mentioned plates are positioned radially outward of the smaller diametered plate.

3. Apparatus according to claim 1 further characterized in that the output terminal area of said output plate is substantially centrally disposed with respect to the points of connection of said diodes with said output plate, and openings in said output plate radially intermediate said output terminal area and said points of connection whereby the impedance of the current path between the output terminal area and each of the said points of connection in the respective circular patterns are equal.

4. A compact rectifier and output terminal assembly for supplying heavy D.C. current from a multiple-phase A.C. source comprising in combination a neutral bus bar, said bus bar having an output terminal end, a plurality of nested current-conductive tubes of unequal diameters positioned concentrically about said bar and insulated from each other and from said bar, the ends of said tubes which are toward said output terminal end having a step relation to each other resulting from the smaller diameter tubes extending outwardly beyond the adjacent ends of the larger diameter tubes, a current-conductive disc-like plate for each of the tubes mounted on their step end extremities and arranged in generally parallel relation to each other concentric about the tubes, current-conductive disc-like output plates interleaved between certain of said first mentioned plates and insulated from said tubes, one of said output plates having an output terminal area adjacent the output terminal end of said bar, an annular series of semi-conductor diodes interconnecting said first mentioned plates with certain of said output plates in patterns concentric about said tubes, current-conductive bars extending longitudinally with said bus bar and interconnecting said output plates at circumferentially spaced points thereon, and certain of said output plates having openings therein radially intermediate the points of connection of the diodes and said conductive bars whereby the impedance of the output paths of the diodes in each annular series thereof is substantially equal.

5. A compact rectifier and output terminal assembly for supplying heavy D.C. current from a multi-phase transformer having closely grouped output terminals comprising a neutral bus bar having an output terminal end and connected at its other end to certain of the output terminals of the transformer, a plurality of concentrically arranged current-conductive tubes of unequal diameters mounted concentrically about said neutral bar and insulated therefrom as well as from each other, the larger diameter tubes being progressively shorter than the smaller diametered tubes to effect a stepped relation at either end of the nest of tubes, means directly connecting one stepped end of said nest of tubes to the other of the transformer output terminals, current conductive discs affixed to the other stepped ends of the tubes, spaced parallel output discs one of which is adjacent the output terminal end of said bus bar and others of which are interleaved between said first mentioned discs, said output discs being interconnected with each other but insulated from said tubes, and an annular series of semi-conductor diodes patterned concentrically about said tubes and interconnecting said first mentioned discs with said output discs.

References Cited by the Examiner

UNITED STATES PATENTS

| | | | |
|---|---|---|---|
| 2,126,067 | 8/1938 | Walter | 317—234 |
| 2,153,434 | 4/1939 | Schimkus | 317—234 |
| 2,921,243 | 1/1960 | Johnson | 317—234 |
| 2,999,971 | 9/1961 | Schnecke | 317—234 X |

FOREIGN PATENTS

| | | |
|---|---|---|
| 1,245,956 | 10/1960 | France. |

DAVID J. GALVIN, *Primary Examiner.*

JAMES D. KALLAM, *Examiner.*